Patented Oct. 19, 1943

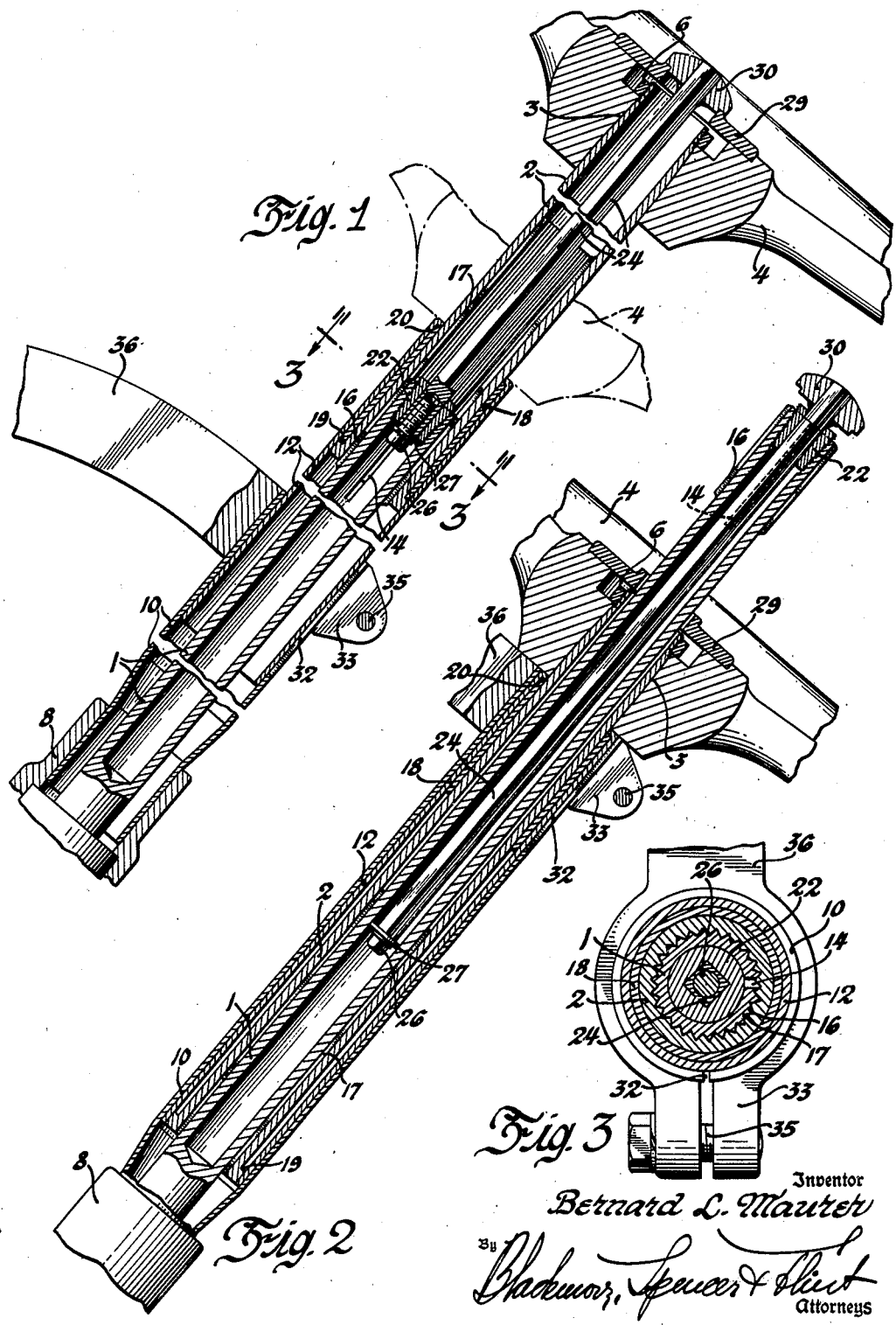

2,331,996

UNITED STATES PATENT OFFICE 2,331,996

TELESCOPIC STEERING COLUMN

Bernard L. Maurer, Saginaw, Mich., assignor to General Motors Corporation, Detroit, Mich., a corporation of Delaware Application July 20, 1942, Serial No. 451,582

8 Claims. (Cl. 74—551.1)

This invention relates to a steering column construction for a motor vehicle or other dirigible craft.

The object of the invention is a telescopic steering column which may be collapsed to a minimum length for economy of space in shipment.

Another object of the invention is a telescopic steering column which may be collapsed to a position in which the steering wheel on the column is inoperative to turn the steering gear.

A further object of the invention is a telescopic steering column the length of which may be adjusted to bring the steering wheel thereon to a desired position in accordance with the requirements of the driver.

The above and other objects of the invention will be apparent as the description proceeds.

In the drawing:

Figure 1 is a longitudinal sectional view of the steering column in a fully extended operative condition.

Figure 2 is a longitudinal sectional view of the steering column in a fully collapsed condition in which the steering wheel is inoperative.

Figure 3 is an enlarged sectional view on line 3—3 of Figure 1.

The steering column includes a tubular steering shaft 1 with a tubular extension shaft 2 sleeved over it, and to the tapered end 3 of which the steering wheel 4 is secured by a nut 6.

The steering shaft 1 extends from a steering gear housing 8 in which it is suitably supported, and is enclosed within a tubular jacket 10 extending from the housing 8, said tubular jacket 10 having a tubular extension 12.

The tubular extension shaft 2 telescopes over the steering shaft 1 which has an internally taper threaded end split by a slit or slits such as 14 and provided with external splines 16, which are adapted to engage internal splines 17 on the extension shaft 2, for transmitting turning movement from one to the other of said shafts.

The tubular extension shaft 2 also telescopes within a bearing 18 in the tubular extension jacket 12 between an external shoulder 19 at the inner end of said tubular extension shaft 2 and an inturned shoulder 20 at the outer end of said tubular extension jacket 12 which telescopes within the tubular jacket 10.

It will be seen that in the structure as thus far described, the telescoping members are freely movable axially of each other into different positions of telescopic extension or may be collapsed one within another, and that the steering shaft 1 can be turned by the steering wheel 4 in the fully extended position of the parts shown in Figure 1 and through a range of lessened extension depending on the lengths of the splines 16 and 17. Beyond this range and in the fully collapsed position shown in Figure 2, the splines 16 and 17 are no longer in engagement but are axially spaced from each other so that the extension shaft 2 to which the steering wheel 4 is secured is disengaged from the shaft 1 and incapable of turning it, and the steering wheel 4 is inoperative.

In order that the steering shaft 1 and its extension 2 may be locked together in any desired operative position of telescopic adjustment, the taper threaded split end of the tubular steering shaft 1 is provided with a taper threaded plug 22 adapted to be turned relatively to the steering shaft, in one direction to expand the split end of said shaft into tightly gripping relationship with the tubular extension shaft 2 in a desired position of telescopic adjustment thereof, and in an opposite direction to release said extension shaft for axial movement to a different desired operative position of telescopic adjustment or else to a collapsed inoperative position.

The means for turning said taper threaded plug 22 to lock the shafts 1 and 2 together is a rod 24 on which the plug 22 is slidingly splined. The rod 24 has a square section and is slidable axially through a square hole in the plug 22 which is retained thereon by a stud 26 and a washer 27.

As shown, the rod 24 extends through a cap 29 on the steering wheel and has a head 30 by which it is suspended from the upper end of that which is the higher of the cap 29 of the steering wheel on the tubular extension shaft 2, and the tubular steering shaft 1, in any given position of telescopic adjustment thereof.

The outer end of the tubular jacket 10 is split by a slit 32 and encircled by a clamp 33 which is tightened by a bolt 35 for clamping the tubular extension jacket 12 in adjusted telescopic relationship to the tubular jacket 10, the clamp 33 being formed as part of a bracket 36 which provides additional support for the steering column.

It will be noted that as the steering wheel 4 along with the shaft extension 2 is raised from the position shown in Figure 2, it does not move the rod 24 until the cap 29 makes contact with the head 30 and thereafter the rod 24 is raised along with the steering wheel. As soon as the flange 19 at the lower end of the shaft extension 2 makes contact with the bearing 18 which is up against the inturned flange 20 on the tubular jacket extension 12, the latter also is raised along with the members 2 and 24 until the stop washer 27 on the member 24 is in contact with the taper threaded plug 22 and the limit of telescopic extension shown in Figure 1 is reached. The tubular jacket extension 12 may then be clamped to the tubular jacket 10, and the shafts 1 and 2 locked together in the fully extended position shown in Figure 1.

If an operative position of the steering wheel 4 less than that corresponding to the fully extended position of the shafts 1 and 2 is required, it is only necessary to turn the head 30 of the rod 24 in the proper direction to unlock these two shafts and then to lock them together again after the adjustment, within limits depending on the lengths of the splines 16 and 17, has been made.

If, however, the telescoping members are to be fully collapsed one within another to the inoperative position of the steering wheel 4, it is necessary to loosen the bolt 35 to unfasten the clamp 33 and permit the steering wheel 4 to move beyond the position shown in dot and dash lines in Figure 1, but thrusting the tubular jacket extension 12 to the telescoped position shown in Figure 2.

I claim:

1. In a telescoping steering column, in combination, a steering shaft and an extension shaft, one of said shafts being sleeved over the other to provide for relative telescopic adjustment between them, the innermost of said shafts having an internally taper threaded split end and external splines adapted to engage internal splines on the outermost of said shafts for transmitting turning movement from one to the other of said shafts, a taper threaded plug in the split end of the innermost of said shafts, and means for turning said taper threaded plug relatively to the innermost of said shafts, in one direction to expand the split end of said shaft into tightly gripping relationship with the outermost of said shafts in a desired position of telescopic adjustment thereof, and in an opposite direction to release said shafts for relative axial movement to a different desired position of telescopic adjustment.

2. In a telescopic steering column, in combination, a tubular steering shaft with an internally taper threaded split end, a tubular extension shaft sleeved over the steering shaft for telescopic adjustment relative thereto, and having internal splines adapted to engage external splines on the steering shaft for transmitting turning movement from one to the other, a taper threaded plug in the split end of the steering shaft, and means comprising a rod slidable axially through said taper threaded plug and having a splined connection therewith for turning said taper threaded plug relatively to the steering shaft, in one direction to expand the split end of said shaft into tightly gripping relationship with said tubular extension shaft in a desired position of telescopic adjustment thereof, and in an opposite direction to release said tubular extension shaft for axial movement to a different desired position of telescopic adjustment.

3. The combination according to claim 2 in which the rod for turning said taper threaded plug relatively to the steering shaft has a head by which it is suspended from the upper end of that which is the higher of the tubular extension shaft and the tubular steering shaft in any given position of telescopic adjustment thereof.

4. The combination according to claim 2 in which both the steering shaft and the tubular extension shaft are splined for only a part of their length and the tubular extension shaft is movable to a collapsed position in which it is disengaged from the steering shaft and incapable of turning it.

5. The combination according to claim 2 in which the external splines on the steering shaft are at the split end thereof and are out of engagement with the internal splines on the tubular extension shaft when the latter is telescoped over the steering shaft to the limit of its adjustable movement in this direction.

6. The combination according to claim 2 in which the outer end of said tubular extension shaft projects outwardly from a tubular extension jacket enclosing the inner end of said tubular extension shaft, said tubular extension jacket telescoping within a tubular jacket having a split end encircled by a clamp for clamping the tubular extension jacket in adjusted telescopic relationship to the tubular jacket.

7. The combination according to claim 2 in which the outer end of said tubular extension shaft projects outwardly from a tubular extension jacket enclosing the inner end of said tubular extension shaft, and a bearing for said tubular extension shaft is provided in the upper end of said tubular extension jacket, said tubular extension jacket telescoping within a tubular jacket having a split end encircled by a clamp for clamping the tubular extension jacket in adjusted telescopic relationship to the tubular jacket.

8. The combination according to claim 2 in which the outer end of said tubular extension shaft projects outwardly from a tubular extension jacket enclosing the inner end of said tubular extension shaft, and a bearing for said tubular extension shaft is provided in the upper end of said tubular extension jacket between an external shoulder at the inner end of said tubular extension shaft and an inturned shoulder at the outer end of said tubular extension jacket, said tubular extension jacket telescoping within a tubular jacket having a split end encircled by a clamp for clamping the tubular extension jacket in adjusted telescopic relationship to the tubular jacket.

BERNARD L. MAURER.